(No Model.)
H. B. BODDIE.
PLOW.
No. 427,545. Patented May 13, 1890.
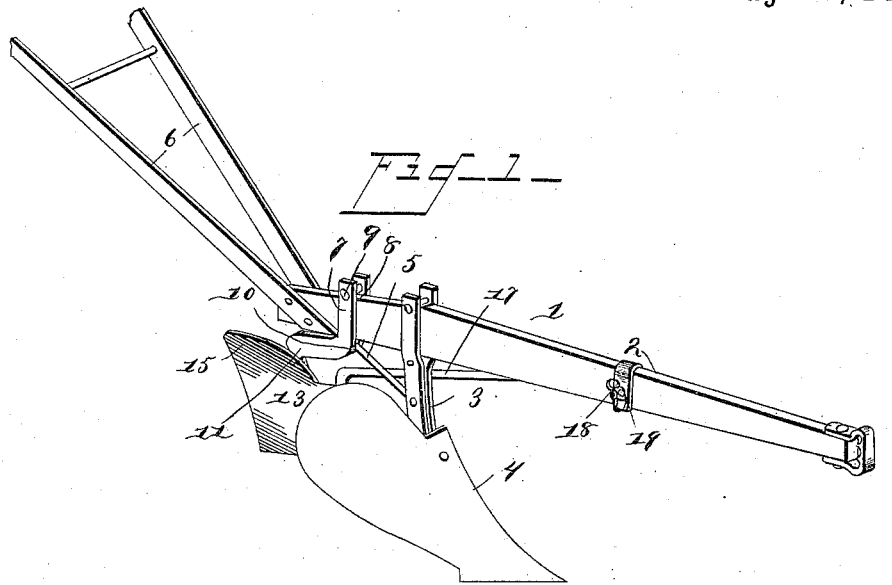
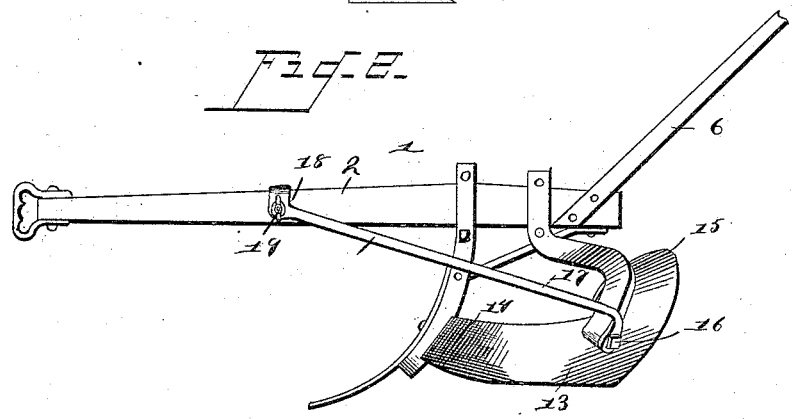
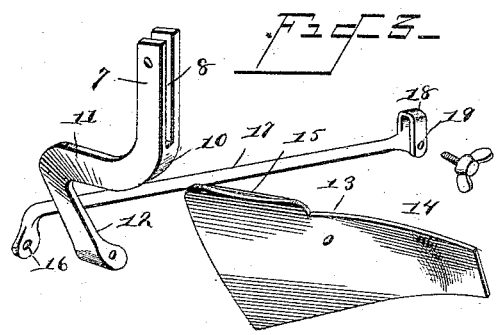
Witnesses
Geo. E. Frich.
Wm. Bagger
Inventor
Henry B. Boddie
By his Attorneys
C. A. Snow & Co.

UNITED STATES PATENT OFFICE.

HENRY BASCOME BODDIE, OF WEOKA, ALABAMA.

PLOW.

SPECIFICATION forming part of Letters Patent No. 427,545, dated May 13, 1890.

Application filed December 17, 1889. Serial No. 334,082. (No model.)

*To all whom it may concern:*

Be it known that I, HENRY BASCOME BODDIE, a citizen of the United States, residing at Weoka, in the county of Elmore and State of Alabama, have invented a new and useful Plow, of which the following is a specification.

This invention relates to an improved plow attachment adapted to be attached to and used in connection with cotton plows or cultivators for the purpose of preventing injury to the roots of the growing plants and of packing the dirt smoothly and evenly around the same, thus leaving the plants in the most favorable condition for growing.

The invention consists in the improved construction and arrangement of the said plow attachment, which will be hereinafter fully described, and particularly pointed out in the claim.

In the drawings hereto annexed, Figure 1 is a perspective view of a plow equipped with my improved attachment. Fig. 2 is a side view taken from the opposite side of the same. Fig. 3 is a perspective view of the attachment detached from the plow.

Like numerals of reference indicate like parts in all the figures.

1 designates a plow of ordinary construction, comprising the beam 2, standard 3, share or blade 4, and brace 5, said plow being equipped in the usual manner, with handles 6 6, by means of which it may be guided in operation.

My improved attachment comprises a foot or standard 7, the upper end of which is bifurcated, as shown at 8, to admit of its being adjusted upon the plow-beam 2 in position for operation in rear of the standard 3, said supplementary foot or standard being clamped upon the plow-beam in position for operation by means of a transverse bolt 9 above the plow-beam. A short distance below the plow-beam the supplementary foot 7 is curved in a rearward direction, as shown at 10, thence laterally and outwardly, as shown at 11, and finally in a downward and forward direction, as shown at 12, bringing its lower end the desired distance in rear of and on the outer side or land side of the plow proper.

To the lower end of the foot 7 is attached the blade or scraper 13, the front end of which is curved forwardly and inwardly, as shown at 14, and the rear end of which is curved upwardly and inwardly, as shown at 15, the lower edge of said scraping-blade occupying an approximately horizontal position. This blade is attached to the foot 7 by means of an ordinary heel-bolt 16, which also extends through a brace 17, the lower end of which is attached to the rear side of the foot 7, while the upper or front end of said brace has a loop or hook 18, attached to the plow-beam by means of a set-screw 19, in order to enable the foot and scraper to be properly adjusted and regulated.

The operation of this invention and its advantages will be readily understood from the foregoing description, taken in connection with the drawings hereto annexed. The plow-beam is in no wise injured by the attachment thereto of my improved device, nor is the draft of the plow materially increased. The plow proper turns the furrow in the usual manner, and the blade 13, which is a sufficient distance in rear of the plow to avoid its being interfered with by clods or rocks, turns an additional slice, thus covering and destroying the weeds. At the same time the said blade serves to press and compact the ridge and to press the soil around the roots of the growing plants, leaving a clean-cut oval ridge, and leaving the crop under the most favorable conditions to insure a rapid and prosperous growth.

Having thus described my invention, I claim and desire to secure by Letters Patent of the United States—

The combination, with a plow, of the herein-described attachment comprising the foot or standard having bifurcated upper end attached to the plow-beam in rear of the standard proper by a transverse clamping-bolt, said supplementary foot being curved rearwardly, laterally in an outward direction, and thence downwardly and forwardly, the scraping-blade, constructed substantially as described and having the approximately horizontal lower edge, and the brace attached to the lower end of the supplementary foot in rear of the latter by a transverse bolt, which serves to attach the scraping-blade to said foot, said brace being extended forwardly and provided with a sleeve encircling the plow-beam and having a set-screw bearing against the latter, substantially as and for the purpose herein set forth.

In testimony that I claim the foregoing as my own I have hereto affixed my signature in presence of two witnesses.

HENRY BASCOME BODDIE.

Witnesses:
   I. H. JUDKINS,
   H. L. WILLIAMS.